US012612013B2

(12) United States Patent
Park et al.

(10) Patent No.: US 12,612,013 B2
(45) Date of Patent: Apr. 28, 2026

(54) WASHER SYSTEM FOR CLEANING MEASUREMENT UNIT

(71) Applicants: Kia Corporation, Seoul (KR); Hyundai Motor Company, Seoul (KR); DY AUTO Corporation, Anyang-si (KR)

(72) Inventors: Jong Min Park, Seoul (KR); Jin Hee Lee, Seoul (KR); Nak Kyoung Kong, Seongnam-si (KR); Young Joon Shin, Seongnam-si (KR); Gyu Won Han, Incheon (KR); Chan Mook Choi, Incheon (KR); Ki Hong Lee, Seoul (KR); Dae Hee Lee, Incheon (KR); Min Wook Park, Incheon (KR); Hyeong Jun Kim, Incheon (KR); Sun Ju Kim, Incheon (KR)

(73) Assignees: Hyundai Motor Company, Seoul (KR); Kia Corporation, Seoul (KR); DY AUTO Corporation, Asan-si (KR)

( * ) Notice: Subject to any disclaimer, the term of this patent is extended or adjusted under 35 U.S.C. 154(b) by 599 days.

(21) Appl. No.: 18/060,563

(22) Filed: Nov. 30, 2022

(65) Prior Publication Data

US 2023/0249651 A1 Aug. 10, 2023

(30) Foreign Application Priority Data

Feb. 7, 2022 (KR) ........................ 10-2022-0015312

(51) Int. Cl.
*B60S 1/56* (2006.01)
*B60R 11/04* (2006.01)
(Continued)

(52) U.S. Cl.
CPC ................. *B60S 1/56* (2013.01); *B60S 1/481* (2013.01); *B60S 1/50* (2013.01); *B60S 1/52* (2013.01); *B60R 11/04* (2013.01)

(58) Field of Classification Search
CPC .... B60S 1/26; B60S 1/481; B60S 1/50; B60S 1/52; B60R 11/04
(Continued)

(56) References Cited

U.S. PATENT DOCUMENTS 9,505,382 B2 11/2016 Gokan
2018/0251099 A1* 9/2018 Satarino ................... B60S 1/50
(Continued)

FOREIGN PATENT DOCUMENTS

JP 2013001310 A 1/2013
JP 2017100522 A 6/2017
(Continued)

*Primary Examiner* — Md Azad
(74) *Attorney, Agent, or Firm* — Slater Matsil, LLP

(57) ABSTRACT

In an embodiment a washer system includes a plurality of measurement units configured to receive data required for vehicle driving, a nozzle configured to provide a washer fluid to the measurement units, a main reservoir configured to store the washer fluid, a sub-reservoir coupled to at least one of the measurement units and configured to be supplemented with the washer fluid from the main reservoir and a controller configured to determine a priority of the measurement units and supply, in response to the priority of the measurement units, the washer fluid from the main reservoir to the sub-reservoir based on the measurement unit having a higher priority.

20 Claims, 7 Drawing Sheets

(51) Int. Cl.
    *B60S 1/48*         (2006.01)
    *B60S 1/50*         (2006.01)
    *B60S 1/52*         (2006.01)

(58) Field of Classification Search
    USPC ............................................................ 700/1
    See application file for complete search history.

(56)                References Cited

U.S. PATENT DOCUMENTS

| | | | |
|---|---|---|---|
| 2018/0334140 A1* | 11/2018 | Ghannam | ................. B60S 1/52 |
| 2018/0354469 A1 | 12/2018 | Krishnan | |
| 2019/0047521 A1 | 2/2019 | Giraud et al. | |
| 2019/0270419 A1* | 9/2019 | Martin | ................. F16D 65/847 |
| 2020/0001331 A1* | 1/2020 | Deane | ..................... B60S 1/487 |
| 2020/0326221 A1* | 10/2020 | Arreaza | .................. G01F 22/00 |
| 2020/0391702 A1* | 12/2020 | Yamauchi | ................ B60Q 9/00 |
| 2020/0406864 A1 | 12/2020 | Sakai et al. | |
| 2021/0061233 A1* | 3/2021 | Robertson, Jr. | .... G02B 27/0006 |
| 2021/0197769 A1* | 7/2021 | Shirakura | ................. B60S 1/56 |
| 2022/0105902 A1* | 4/2022 | Adachi | ................ B05B 1/3006 |

FOREIGN PATENT DOCUMENTS

| | | |
|---|---|---|
| KR | 20190133241 A | 12/2019 |
| WO | 2018059793 A1 | 4/2018 |

* cited by examiner

WASHER SYSTEM FOR CLEANING MEASUREMENT UNIT

CROSS-REFERENCE TO RELATED APPLICATIONS

This application claims the benefit of Korean Patent Application No. 10-2022-0015312, filed on Feb. 7, 2022, which application is hereby incorporated herein by reference.

TECHNICAL FIELD

The present disclosure relates to a washer system for cleaning a measurement unit and, more particularly, to a washer system for cleaning a measurement unit by performing the distribution of a washer fluid between a main reservoir and a sub-reservoir fluidly connected to each measurement unit, thereby improving the driving environment of an autonomous vehicle.

BACKGROUND

Most commercially available washer devices are configured to clean the windshield and rear window, and some additional components can be additionally cleaned with ease at the same time. Likewise, special cleaning devices, which are particularly suitable for cleaning individual components, such as headlight washer systems, are known.

Another improvement direction for modern automobiles is autonomous computer-controlled driving. To this end, various assistance systems are required to assist a vehicle user during vehicle driving and to perform various functions. This requires continuously detecting and monitoring the surroundings of the vehicle in an automated and reliable way. Some assistance systems obtain information about the vehicle's surroundings from optical or photoelectric sensing devices, such as cameras, laser imaging detection and ranging (LiDAR) sensors or infrared sensors. These types of devices have transparent elements, such as lenses or covers, which, depending on the application, transmit light without limitation or in a certain limited wave range. Since these types of devices are often arranged in an area outside of a vehicle, the devices are contaminated by external weather influences, and for ensuring their function, essentially require a washer fluid system.

In the case of autonomous or partially autonomous driving, the sensing devices must always be able to operate functionally without driver intervention, and these requirements are also inevitably applied to the corresponding washer system, which must always be ready for operation.

Moreover, in view of the requirements due to autonomous driving, the known washer system has many shortcomings or is currently unsuitable for performing autonomous driving. For example, the driver cannot assess the degree of contamination of individual sensors or cameras, since the driver can essentially only see the windshield and in some situations, only the rear window.

Known washer systems may not expand or may expand insufficiently, for example to clean a different number of cameras and other loads depending on the vehicle and its configuration, with the result that the washer systems are expensive and can be only tailored to specific customer requirements. When multiple components are connected together, multiple components are forcibly cleaned unnecessarily, even if cleaning is not explicitly required.

Furthermore, in the case of a well-known washer system, there is a need to perform rapid distribution of a washer fluid, for example, in response to a washer fluid distribution request of an autonomous vehicle including multiple external components requiring cleaning.

SUMMARY

Embodiments provide a solution to the above-described problem associated with the related art. Further embodiments provide a measurement unit cleaning washer system that includes respective sub-reservoir fluidly connected to at least one measurement unit to provide a washer fluid immediately in response to a cleaning request of the measurement unit.

Various embodiments provide a washer system for cleaning a measurement unit, wherein the washer system controls a washer fluid supplied from a main reservoir to a sub-reservoir in response to the storage state of the washer fluid between the main reservoir and the sub-reservoir.

Various embodiments provide a washer system with the following configuration.

In an embodiment a washer system for cleaning a measurement unit is provided, the washer system including: a plurality of measurement units receiving data required for vehicle driving; a nozzle through which a washer fluid is discharged to the measurement unit; a main reservoir storing the washer fluid therein; a sub-reservoir coupled to at least one of the measurement units and supplemented with the washer fluid from the main reservoir; a controller configured to determine the priority of the measurement units used in the driving environment of an autonomous vehicle, and in response to the priority, supply the washer fluid from the main reservoir to the sub-reservoir corresponding to the measurement unit having high priority.

In addition, the washer system may further include: a main washer pump disposed in the main reservoir to discharge a pressurized washer fluid; and a sub-washer pump disposed in the sub-reservoir to spray a pressurized washer fluid to the measuring unit.

In addition, the washer system may further include: a first level sensor disposed in the main reservoir; a second level sensor disposed below the first level sensor in the main reservoir; and a sub-level sensor disposed in the sub-reservoir and configured to determine the level of the washer fluid in the sub-reservoir.

In addition, the controller may be configured to notify the user of a request for immediate supplement of the main reservoir with the washer fluid when the washer fluid level is measured to be below the second level sensor.

In addition, the controller may be configured to supply the washer fluid to the sub-reservoir to an expected amount of supplement, and to supply the washer fluid from the main reservoir to the sub-reservoir in a pulse form to the maximum supplement amount.

In addition, the controller may be configured to determine whether a daily usage capacity of the washer fluid is supplied, through the first level sensor, and determine a vehicle drive-returnable capacity of the washer fluid through the second level sensor.

In addition, when the washer fluid capacity of the main reservoir is determined to be less than or equal to the second level sensor, the controller may be configured to supplement the sub-reservoir with a washer fluid in a capacity smaller than that used in the nozzle.

In addition, when a request for cleaning a measuring unit coupled to the sub-reservoir is received while the washer fluid is supplied from the main reservoir to the sub-reservoir, the controller may be configured to supply the washer fluid to the sub-reservoir after spraying the washer fluid through the nozzle corresponding to the measuring unit in advance.

In addition, the controller may be configured to calculate the remaining amount of washer fluid in the sub-reservoir by storing the number of operations of the nozzles respectively coupled to the measurement units.

In addition, the controller may be configured to supplement the washer fluid to the sub-reservoir fluidly connected to the nozzle when the number of operations of the nozzle is equal to or greater than a preset number of times.

In addition, the controller may be configured to determine the priority of the measurement units when receiving requests for cleaning at least two or more measurement units, and supply the washer fluid from the main reservoir to the sub-reservoir having a higher priority.

In addition, the washer system may further include: a distributor disposed between the main reservoir and the sub-reservoir or between the sub-reservoir and the measuring unit.

In addition, the distributor may be configured to be coupled to one sub-reservoir, and the plurality of measurement units may be coupled to a discharge end of the distributor.

In addition, the controller may be configured to supplement the sub-reservoir in advance and then the main reservoir with the washer fluid when the washer fluid is supplied from the outside of the vehicle.

In addition, the controller may be configured to supply the washer fluid to the sub-reservoir when the washer fluid is measured by the second level sensor in a state in which the washer fluid is supplied from the outside of the vehicle, and to completely supplement the main reservoir with the washer fluid when the washer fluid is measured by the sub-level sensor disposed in the sub-reservoir.

The present disclosure can obtain the following effects by the configurations and combinations thereof, and the use relationship described below.

The present disclosure can provide the washer system that supplies a washer fluid to the sub-reservoir fluidly connected to each measuring unit through the main reservoir, thereby providing a washer fluid distribution system immediately spraying the washer fluid to the measurement unit.

In addition, the present disclosure can provide a washer fluid distribution strategy usable at the time of driving of a vehicle through the washer system configured to control a flow of washer fluid in the main reservoir and the sub-reservoir in response to various washer fluid environments.

In addition, the present disclosure can continuously supply a washer fluid to the measurement unit in response to various cleaning request environments, thereby providing stable driving performance.

The effects of the present disclosure are not limited to those described above, and other effects not mentioned will be clearly recognized by those skilled in the art from the following description.

DETAILED DESCRIPTION OF ILLUSTRATIVE EMBODIMENTS

Figure 1:
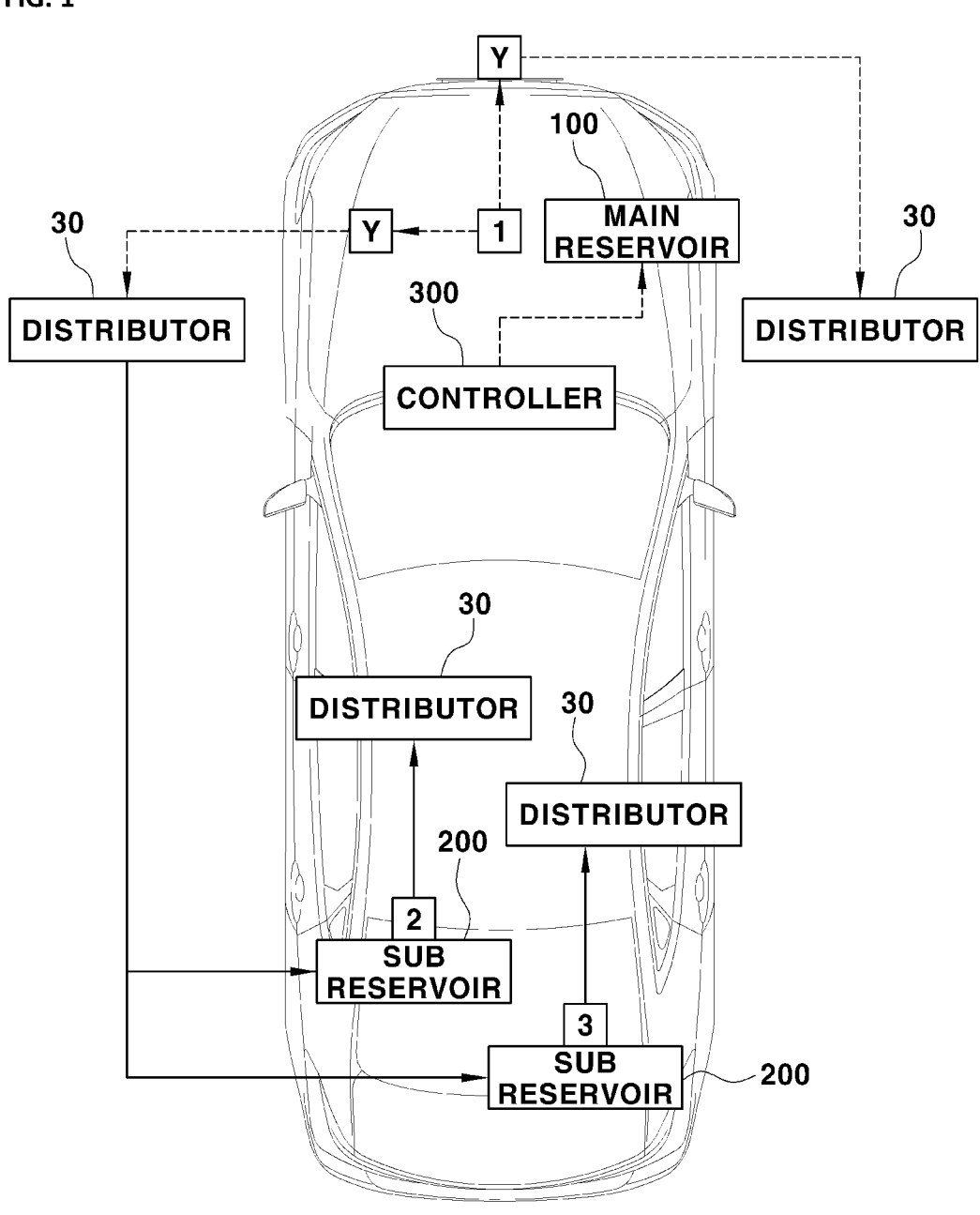
FIG. 1 is a block diagram illustrating a vehicle including a washer system for cleaning a measurement unit according to an embodiment of the present disclosure.

Hereinafter, embodiments of the present disclosure will be described in more detail with reference to the accompanying drawings. The embodiments of the present disclosure may be modified into various forms, and the scope of the present disclosure should not be construed as being limited to the following embodiments. The present embodiments are provided to more completely describe the present disclosure to an ordinary skilled person in the art.

In addition, terms such as " . . . part", " . . . unit", " . . . module", etc. described herein mean a unit portion that processes at least one function or operation, wherein the unit portion may be implemented by hardware, software or a combination of hardware and software.

In addition, it will be understood that, although the terms "first", "second", etc. may be used herein to distinguish elements because the name of the elements are the same, the elements are not necessarily limited to the order in the following description.

In addition, in the present specification, the term "pre-set number of times" may be interpreted as a concept including a flow rate of washer fluid discharged through the nozzle 20.

Hereinafter, exemplary embodiments will be described in detail with reference to the accompanying drawings. In the description, the same or corresponding constituent elements are assigned the same reference numerals, and redundant descriptions thereof will be omitted.

The present disclosure relates to a washer system for cleaning a measurement unit by spraying a washer fluid to a measurement unit 10 located in a vehicle. The washer system includes a main reservoir 100 in which a washer fluid is stored, a plurality of sub-reservoirs 200 coupled to the main reservoir 100 and having a smaller storage amount of washer liquid compared to the main reservoir 100, and a nozzle 20 configured to spray the washer liquid from the sub-reservoir 200 to the measurement unit 10.

The measurement unit 10 includes a plurality of sensor units for performing autonomous driving. More preferably, the measurement unit 10 may be at least one of an ultra-wideband communication radar (IR-UWB RADAR), a LiDAR, a frequency-modulated continuous wave radar (FMCW RADAR), and a Doppler radar (DOPPLAR RADAR).

In the case where the measurement unit 10 is an ultra-wideband communication radar (IR-UWB RADAR), ultra-wideband communication (UWB) refers to a radio technology that uses a frequency band of 500 MHz or higher or has a value defined as a specific bandwidth of 25% or more. The specific bandwidth means a bandwidth of a signal with respect to a center frequency. Ultra-wideband communication (UWB) is a radio technology that uses a broadband frequency, and has various advantages such as high range resolution, transparency, strong resistance to narrowband noise, and coexistence with other devices sharing a frequency. For example, ultra-wideband communication (UWB) has an advantage in that even minute movement of an object can be detected in ultra-precise range resolution characteristics of 1 cm or less.

In addition, as the measurement unit 10, LiDAR uses 1550 nm near-infrared rays. Due to the strong straightness, there is no distortion while the laser hits an object and returns. In this way, LiDAR perceives the object more precisely.

Moreover, the measurement unit 10 may include a Time of Flight (ToF) sensor or an ultra sound sensor. The ToF sensor or the ultra sound sensor is configured to measure the distance of an object perceived from the outside of a vehicle.

In addition, the measurement unit 10 may include windshield glass, a camera, a collision sensor, and the like, as well as all components essentially required in performing manual driving and autonomous driving of a vehicle.

The vehicle of the present disclosure may include a shared vehicle or a commercially available vehicle, and in the case of vehicle arrival at a station or destination, this may be construed as meaning a location where the washer fluid can be injected into the main reservoir 100 from the outside.

In addition, a controller 300 may be configured to calculate the required washer fluid usage on the basis of actual driving data including the driving environment, the mileage, the driving route, and the cleaning cycle and number of times of a vehicle, and based on this, to calculate a required flow rate of washer fluid (a flow rate of washer fluid according to the number of times that can be sprayed) to be used until vehicle return (arrival at station or destination).

In the present disclosure, the controller may be considered a concept including all of a vehicle controller, a motor controller, a valve controller, and a communication unit.

Figure 2:
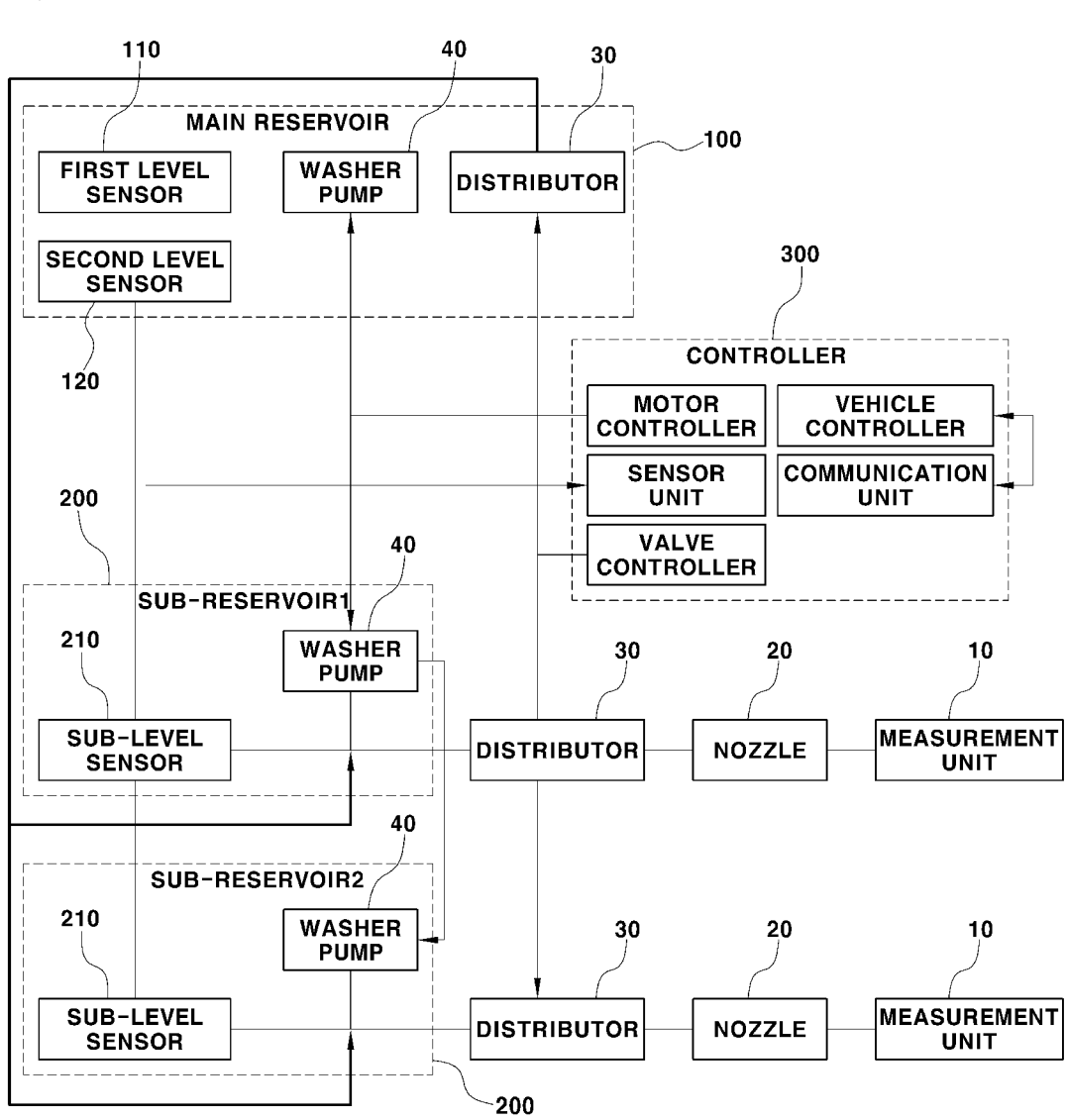
FIG. 2 illustrates a coupling structure of the washer system according to an embodiment of the present disclosure.

FIGS. 1 and 2 are diagrams illustrating the configuration of a measurement unit 10 cleaning washer system according to an embodiment of the present disclosure.

As illustrated, the washer system includes the main reservoir 100 positioned in a vehicle, and is configured such that a discharge end thereof is coupled to at least one sub-reservoir 200. The main reservoir 100 may include at least one discharge end, and may be further provided with a distributor 30 disposed at the discharge end. Alternatively, a plurality of discharge ends of the main reservoir 100 may be provided such that the distributor 30 is coupled to at least one discharge end, or otherwise, the discharge end may be directly coupled to the sub-reservoir 200. The washer system includes a main washer pump and a sub washer pump 40 respectively disposed in the main reservoir 100 and the sub-reservoir 200. The washer system also includes a washer pump motor 50 to drive the main washer pump 40 or the sub washer pump 40 with a received electrical signal. When the washer pump 40 is driven, the washer fluid stored in the main reservoir 100 or the sub reservoir 200 is configured to be pressurized, so that the washer fluid is discharged to each reservoir discharge end. The flow rate and pressure of the discharged washer fluid may be different depending on the driving conditions of the washer pump 40. In addition, the flow rate and pressure of the washer fluid discharged to the nozzle 20 coupled to the sub-reservoir 200 may be set differently depending on the measurement units 10.

The discharge end of the sub-reservoir 200 includes a nozzle 20 disposed at a position corresponding to the measurement unit 10 of a vehicle, and is configured to clean the measurement unit 10 through the nozzle 20. The sub-reservoir 200 is configured to be fluidly connected to the at least one or more measurement units 10, and the sub-reservoir 200 coupled to the plurality of measurement units 10 is fluidly connected to the at least one or more measurement units 10 through the distributor 30. Accordingly, the washer pump 40 located in the sub-reservoir 200 is driven, and the distributor 30 is opened or closed to select a nozzle 20 so that the washer fluid is sprayed to the measurement unit 10 through the selected nozzle 20.

The main reservoir 100 includes two level sensors, i.e., a first level sensor 110 disposed at a relatively high position in the main reservoir 100, and a second level sensor 120 disposed at a relatively low position in the main reservoir 100.

The first level sensor 110 may be located at a height at which a flow rate of washer fluid essentially required for daily driving of an autonomous vehicle (hereinafter referred to as a daily driving capacity of washer fluid) is measured, and the second level sensor 120 may be located at a height at which a flow rate of washer fluid in an autonomous vehicle, at which a vehicle is returnable to the driving, (hereinafter referred to as a vehicle drive-returnable capacity of washer fluid) is measured.

The daily driving capacity of washer fluid and the vehicle drive-returnable capacity of washer fluid may be set based on real-time data stored in the controller 300, which may set a flow rate of washer fluid by using the accumulated driving data of the vehicle.

Furthermore, the sub-reservoir 200 may include one sub-level sensor 210, which may be formed at a position adjacent to the maximum supplement region of the sub-reservoir 200.

When the storage of washer fluid is measured to be below the second level sensor 120 of the main reservoir 100, the controller may be configured to transmit a washer fluid supplement request signal through a cluster or an alarm. Moreover, when the washer fluid storage of the main reservoir 100 is measured to be equal to or less than the second level sensor 120, the controller 300 may perform the comparison with a flow rate of washer fluid used in the nozzle 20 so that a relatively low flow rate of washer fluid is supplemented in the sub-reservoir 200.

Moreover, the controller 300 is configured to control the distributor 30 to introduce the washer fluid into the sub-reservoir 200 under the condition that the washer fluid is supplied up to the position of the second level sensor 120 of the main reservoir 100 with the washer fluid supplied from the outside of a vehicle, and to completely supplement the main reservoir 100 when the washer fluid is supplied up to the position of a sub-level sensor 210 located in each sub-reservoir 200. That is, the controller 300 is configured to completely supplement the sub-reservoir 200 and the main reservoir 100 in sequence when the washer fluid is suppled from the outside of a vehicle.

The controller 300 is configured to receive a user's request or a measurement unit cleaning request essentially required for vehicle driving, and supply power to the washer pump 40 of the sub-reservoir 200 corresponding to the request. Furthermore, the controller is configured to control the distributor 30 connected to the sub-reservoir 200 to spray the washer fluid to the measurement unit 10 required to be cleaned.

In addition, the controller 300 is configured to store the priority when performing driving of the measurement unit 10 fastened through each nozzle 20. That is, the controller 300 may set the priority of essential measurement units 10 of a vehicle performing autonomous driving, and selectively clean the measurement units 10 in response to the amount of washer fluid stored in the main reservoir 100 and the sub-reservoir 200. In an embodiment of the present disclosure, the controller 300 may set the radar and lidar to have the highest priority as the measurement unit 10 for performing autonomous driving.

In addition, the controller 300 is configured to measure the number of times of cleaning of each measuring unit 10 to calculate the remaining amount of washer fluid and the spraying amount of the sub-reservoir 200 fluidly connected to the corresponding measurement unit 10, and when the washer fluid is sprayed to the measurement unit 10 more than a set number of times, to supply the washer fluid to the sub-reservoir 200 through the main reservoir 100. That is, the controller 300 measures and stores the number of operations of the nozzle 20, and supplies the washer liquid from the main reservoir 100 to the sub-reservoir 200 when the nozzle 20 is operated more than a preset number of times. More preferably, the number of times preset to the controller 300 may be set differently depending on the measurement unit 10 to which the washer fluid is sprayed. The number of times may be calculated based on the flow rate and pressure of the washer fluid sprayed to each measurement unit 10. As such, the number of driving times of the washer pump 40 in the main reservoir 100 can be reduced.

In addition, when the washer fluid is supplied from the outside of a vehicle, the controller 300 is configured to supplement the sub-reservoir 200 first, and then supplement the main reservoir 100. Accordingly, as the washer fluid is supplied from the outside, both the sub-reservoir 200 and the main reservoir 100 may be set to have the maximum storage.

In addition, when a cleaning request is received from two or more different measurement units 10, the controller 300 firstly supplies the washer fluid to the sub-reservoir 200 fluidly connected to the higher priority measurement unit 10, and then supplies the washer fluid to the sub-reservoir 200 fluidly connected to the lower priority measurement unit 10.

Furthermore, upon receiving a signal to spray the washer fluid to the nozzle 20 fluidly connected to the sub-reservoir 200 during the supply of the washer fluid from the main reservoir 100 to the sub-reservoir 200, the controller 300 stops the supply of the washer fluid to the sub-reservoir 200, and cleans the measurement unit 10 in advance through the nozzle 20. The controller is configured to supply the washer fluid from the main reservoir 100 to the sub-reservoir 200 after the cleaning is completed.

As such, the controller 300 is configured to determine and store the priority of the measurement units 10 used in the autonomous driving environment of a vehicle, determine the levels of the washer fluid in the main reservoir 100 and the sub-reservoir 200, and supply the washer fluid from the main reservoir 100 to the sub-reservoir 200 fluidly connected to the higher priority measurement unit 10 in response to the priority stored in a state in which the level of the washer fluid is low, thereby providing the effect of increasing the vehicle driving stability.

Figure 3:
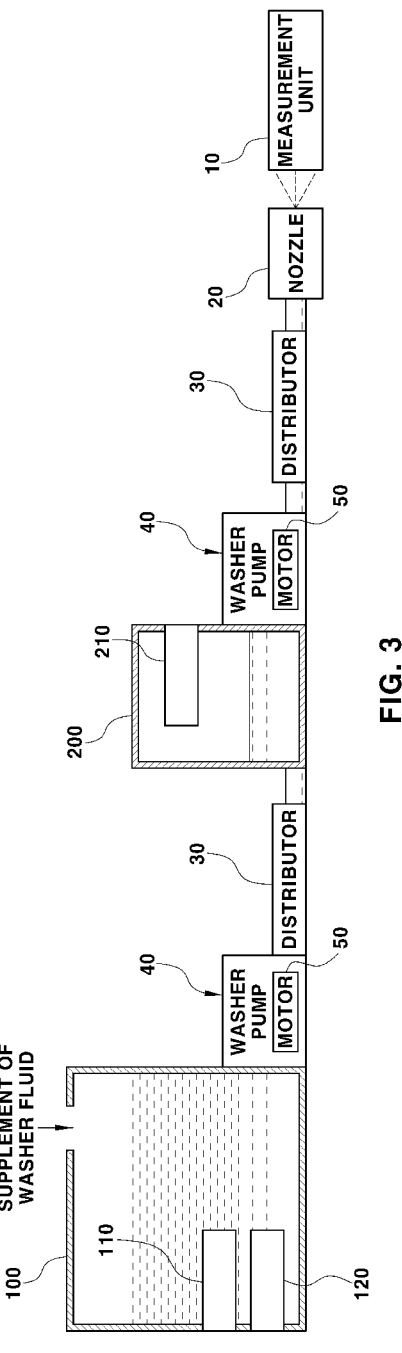
FIG. 3 illustrates a coupling structure between components performing the supplement of a sub-reservoir of the washer system according to an embodiment of the present disclosure.
Figure 4:
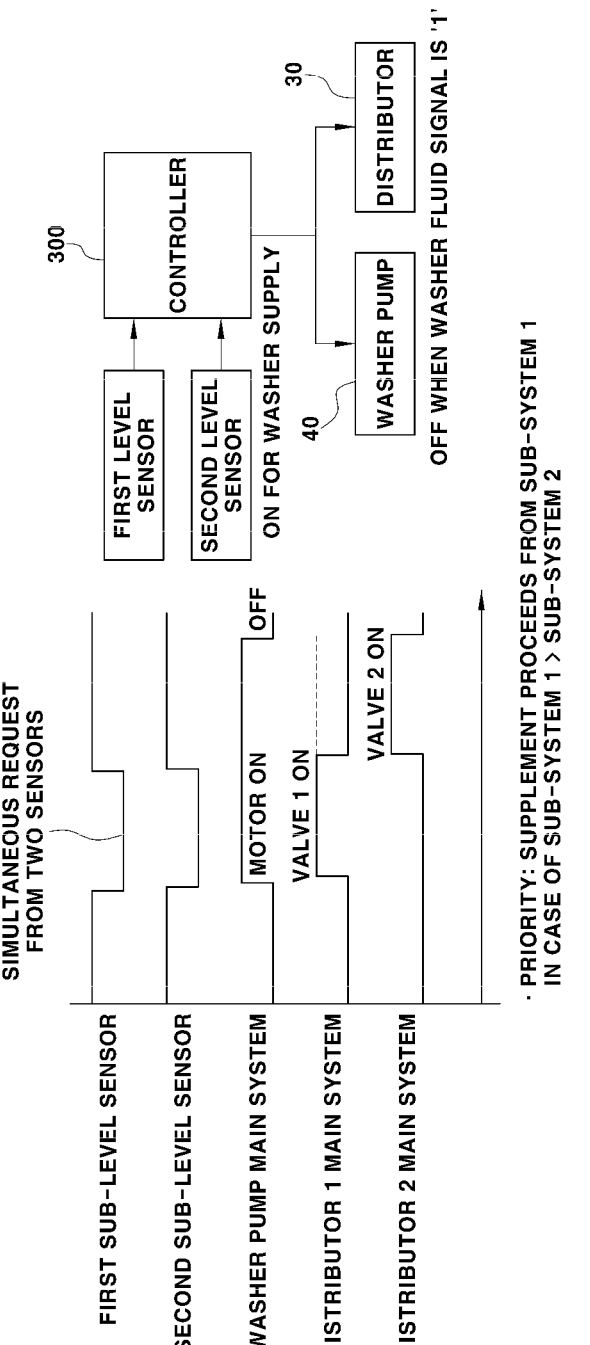
FIG. 4 illustrates an opening/closing structure of a distributor in a region in which the sub-reservoir of the washer system is supplemented according to an embodiment of the present disclosure.

FIGS. 3 and 4 illustrate the configuration of supplying the washer fluid from the main reservoir 100 to the sub-reservoir 200 depending on the priority of the measurement units 10 when the storage of the washer fluid is insufficient in the sub-reservoir 200 according to an embodiment of the present disclosure.

As illustrated, when the number of times to user the nozzle 20 of the measurement unit 10 is determined to be equal to or greater than a preset number, the controller is configured to supply the washer fluid from the main reservoir 100 to the sub-reservoir 200. That is, the controller 300 turns on the washer pump 40 motor 50 located in the main reservoir 100, and supplies the washer fluid into the selected sub-reservoir 200 via the distributor 30.

Moreover, in response to the supplement request of the plurality of sub-reservoir 200, the controller 300 supplements the sub-reservoir 200 with the washer fluid in consideration of the priority of the measurement units 10.

As illustrated, when the washer fluid supplement request is received from the first sub-reservoir 200 and the second sub-reservoir 200, the controller 300 is configured to control the distributor 30 connected to the main reservoir 100 to supply the washer fluid to the higher priority first sub-reservoir 200 in advance, and drive the washer pump 40 of the main reservoir 100. Furthermore, the controller 300 opens the distributor 30 of the main reservoir 100 to perform the supplement of the washer fluid into the second sub-reservoir 200 after the supplement of the first sub-reservoir 200 is completed.

Figure 5:
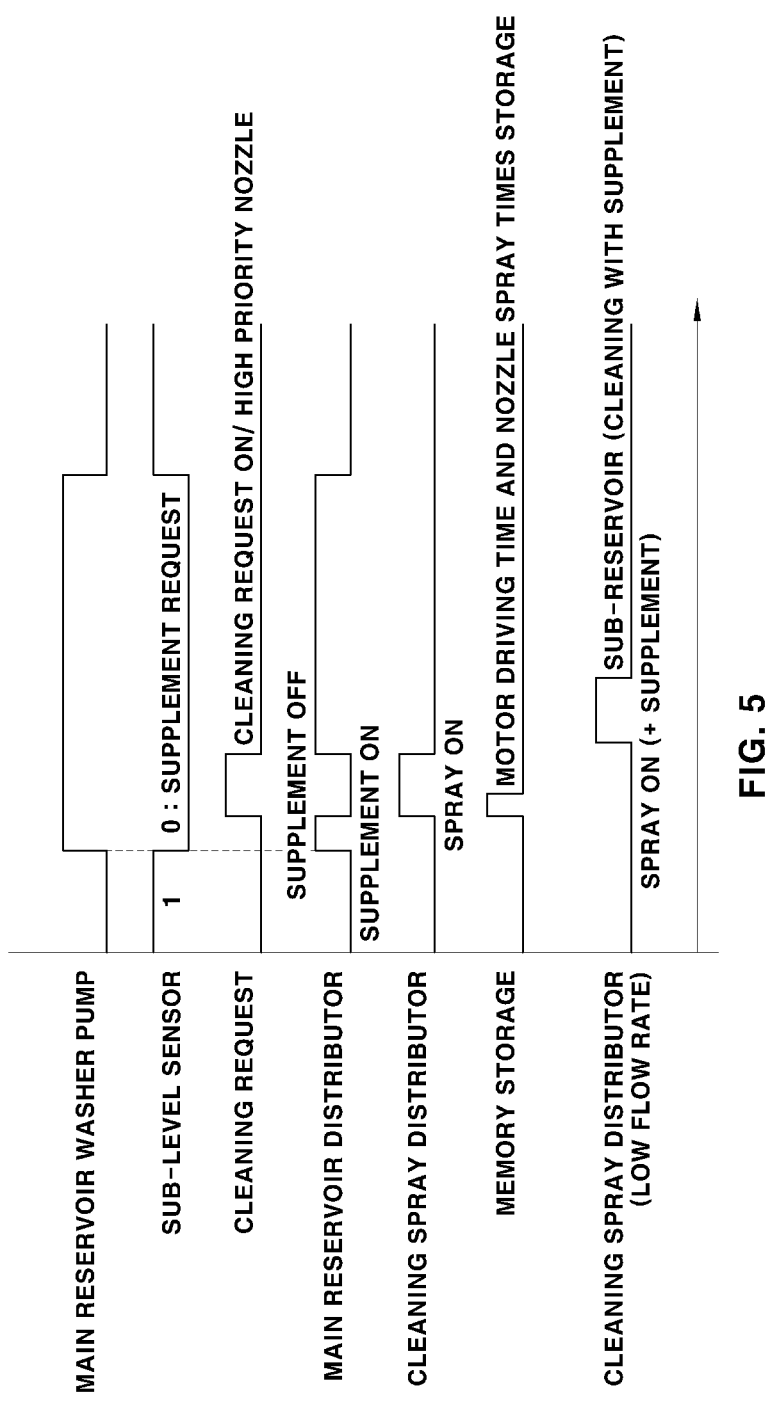
FIG. 5 illustrates a driving structure between the main reservoir and the sub-reservoir when cleaning and supplement are simultaneously performed according to an embodiment of the present disclosure.

FIG. 5 illustrates the control stage in the case where during the supply of the washer fluid from the main reservoir 100 to the sub-reservoir 200, a cleaning request for the measurement unit 10 coupled to the sub-reservoir 200 is applied, according to as an embodiment of the present disclosure.

When the number of spray times of the nozzle 20 coupled to the sub-reservoir 200 is measured to be greater than or equal to a preset number, the controller 300 controls the washer fluid to flow from the main reservoir 100 into the sub-reservoir 200. More preferably, the controller 300 determines whether a total of spray times of the plurality of nozzles 20 (the flow rate of washer fluid) coupled to the sub-reservoir 200 is equal to or greater than a preset number.

Accordingly, when a cleaning request is received while the washer fluid is supplied from the main reservoir 100 to the sub-reservoir 200, the controller 300 is configured to stop the supply of the washer fluid flowing from the main reservoir 100 into the sub-reservoir 200, and then precede spraying of the washer fluid to the nozzle 20 of the measurement unit 10.

After the spraying of the washer fluid through the nozzle 20 is completed in response to the cleaning request, the controller is configured to supply the washer fluid to the sub-reservoir 200 through the main reservoir 100. However, when the washer fluid supplement condition of the sub-reservoir 200 is satisfied, the washer pump 40 maintains an on-state from the initial state to the state in which the sub-reservoir 200 is completely supplemented with the washer fluid.

That is, after performing a cleaning request related to the driving environment in advance, the controller performs the supplement of the sub-reservoir 200 with the washer fluid.

More preferably, the controller 300 is configured to control the driving of the motor 50 of the washer pump 40 of the main reservoir 100, wherein in performing the supplement, the controller is configured to apply power to the washer pump 40 motor 50 and stop driving of the washer pump 40 in response to the cleaning request. Thereafter, the controller is configured to drive the washer pump 40 motor 50 of the sub-reservoir 200 in response to the cleaning request, and to re-drive the washer pump 40 motor 50 of the main reservoir 100 after the cleaning is completed.

In addition, in the case of a request for supplementing the washer fluid to the sub-reservoir 200, the controller controls the washer fluid to flow to the sub-reservoir 200 from the main reservoir 100 under the condition that the number of the spray times of the nozzle 20 fluidly connected to the sub-reservoir 200 is equal to or greater than a preset number of times.

However, even when the cleaning request and the supplement request for the sub-reservoir 200 are simultaneously received, the controller may control the washer fluid to be intermittently introduced into the sub-reservoir 200 from the main reservoir 100 while spraying the washer fluid (cleaning operation) through the nozzle 20, if the washer liquid storage in the sub-reservoir 200 is less than the set storage.

In addition, the controller 300 may be configured to perform the cleaning operation while supplementing the sub-reservoir 200 with the washer fluid through the main reservoir 100 under the condition that upon the cleaning request, low flow rate and pressure are requested.

Figure 6:
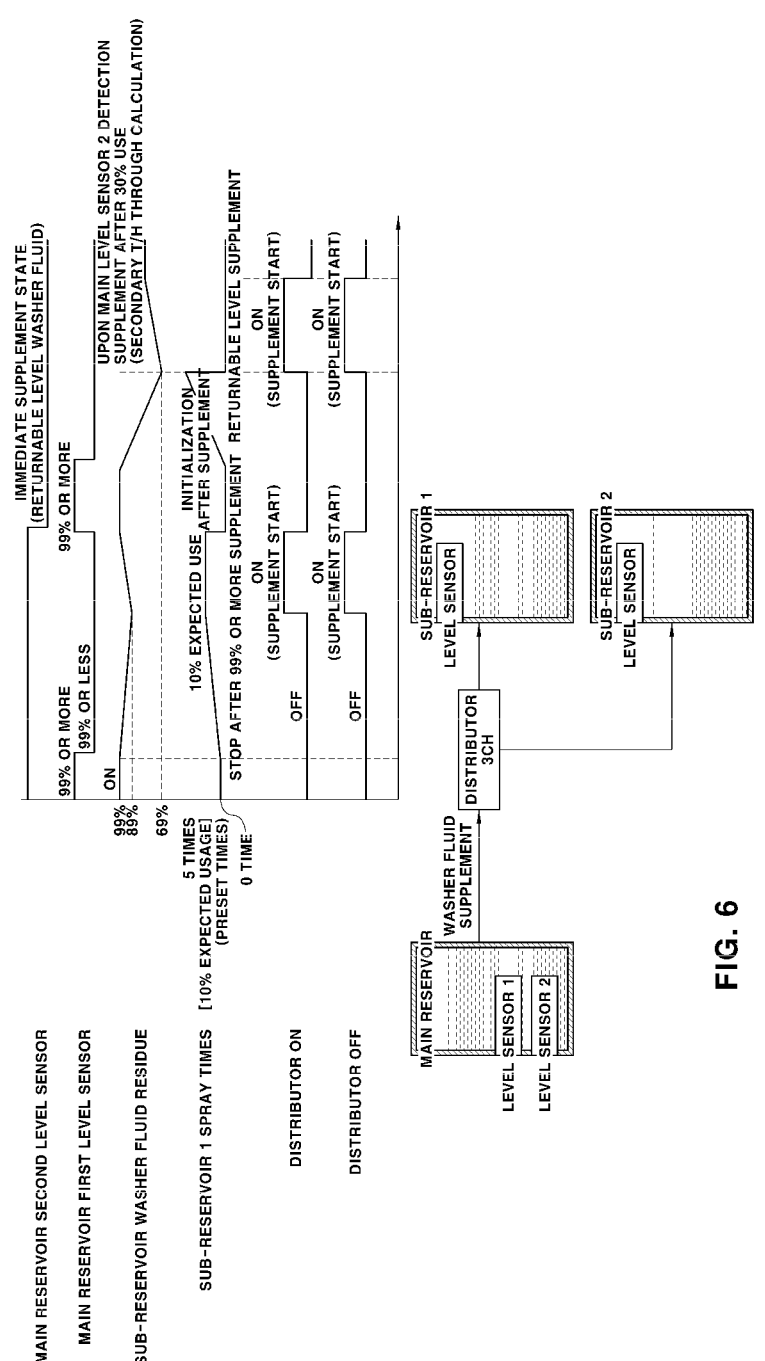
FIG. 6 illustrates a driving structure in a region in which the washer fluid is supplied to the sub-reservoir through the main reservoir according to an embodiment of the present disclosure.

FIG. 6 illustrates the configuration in which the washer fluid is supplied from the main reservoir 100 to the sub-reservoir 200 in the hysteresis section for reducing the use period of the motor 50 of the washer pump 40.

The controller 300 is configured to store the number of use times of the nozzle 20 fluidly connected to the sub-reservoir 200. Furthermore, the controller is configured to store the set values of the flow rate and hydraulic pressure of the washer fluid of each nozzle 20 sprayed through the sub-reservoir 200, and based on the stored values, measure the flow rate of the washer fluid used through the sub-reservoir 200.

In addition, when the washer fluid is suppled from the main reservoir 100 or the outside of a vehicle, the controller 300 is configured to initialize the number of spray times of the washer fluid sprayed through the nozzle 20 and store the number of spray times occurring thereafter.

As such, the controller 300 is configured to compare the number of use times of the nozzle 20 of the sub-reservoir 200 with a preset number of times. More preferably, the number of use times of the nozzle 20 may be determined in consideration of the flow rate and hydraulic pressure of the washer fluid discharged through each nozzle 20. That is, in an embodiment of the present disclosure, the use times and usage of the washer fluid through each nozzle 20 coupled to the sub-reservoir 200 are measured, and if it is determined that, based on these measurement, the washer fluid is supplied in a larger amount than the number of use times of the nozzle 20 stored in the controller 300, power is applied to the washer pump 40 of the main reservoir 100. Accordingly, the washer fluid of the main reservoir 100 is configured to flow into the sub-reservoir 200.

However, when the amount of washer fluid stored in the main reservoir 100 is less than or equal to the second level sensor 120, the controller 300 is configured to supplement the sub-reservoir 200 with a relatively smaller amount of washer fluid than the amount of washer fluid of the sub-reservoir 200 used corresponding to the use of the nozzle 20. More preferably, the controller is configured to supplement the sub-reservoir 200 only with a flow rate of washer fluid that is expected to be used until a vehicle arrives at a station or destination.

As such, the controller 300 is configured to measure the number of use times (the flow rate of washer fluid that is used) of the nozzle 20, and if the washer fluid is used more than the set flow rate, to supplement the sub-reservoir 200. Moreover, the controller is configured to supplement the sub-reservoir 200 only with the flow rate of the vehicle-returnable washer fluid in consideration of the flow rate of the washer fluid of the main reservoir 100.

Figure 7:
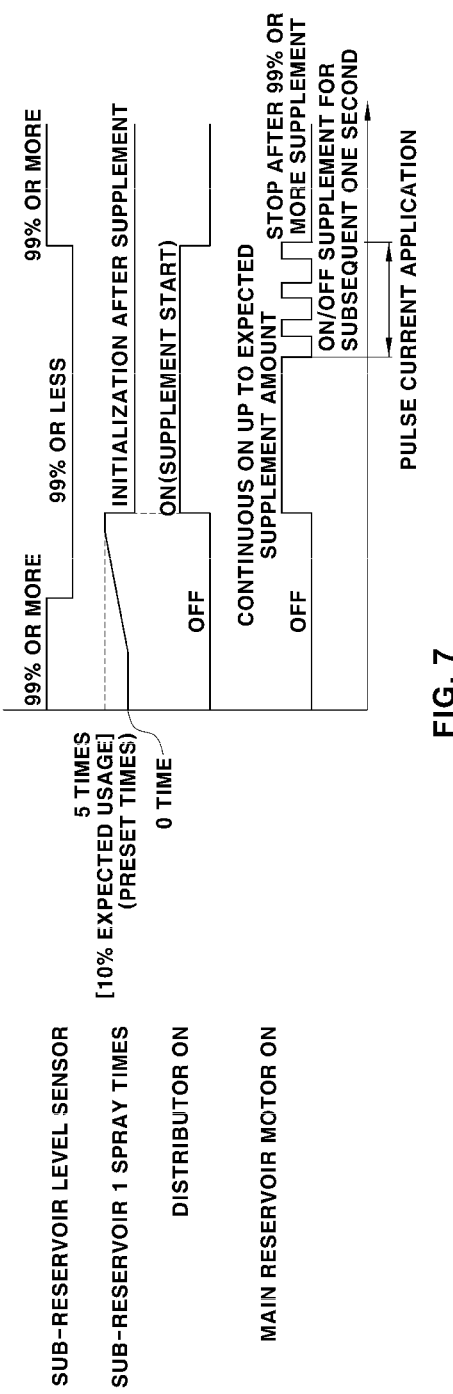
FIG. 7 illustrates a driving structure for preventing over-supplement in a region in which the washer fluid is supplied to the sub-reservoir through the main reservoir according to an embodiment of the present disclosure.

FIG. 7 illustrates the control stage for preventing over-supplement of the washer fluid flowing into the sub-reservoir 200 according to an embodiment of the present disclosure.

In one embodiment of the present disclosure, the controller 300 is configured to drive the washer pump 40 motor 50 located in the main reservoir 100 in response to the washer fluid supplement request of the sub-reservoir 200. More preferably, the sub-level sensor 210 located in the sub-reservoir 200 is configured to be mounted at a position close to the upper end of the sub-reservoir 200, and when the washer fluid is supplemented to face the sub-level sensor 210, the washer fluid in the sub-reservoir 200 is configured to have a maximum capacity. Accordingly, the controller 300 applies power to the washer pump 40 of the main reservoir 100 so that the washer fluid is continuously supplemented up to the expected storage position of the washer fluid having a predetermined level.

Then, the controller 300 is configured to apply a pulse current to the washer pump 40 motor 50 of the main reservoir 100, and accordingly, when it is determined that the washer fluid is supplied to a position of the sub-level sensor 210 or higher, cut off the current applied to the washer pump 40 of the main reservoir 100.

More preferably, the controller 300 is configured to apply a multiplicity of power pulses a second to the washer motor 50 of the main reservoir 100 in a state in which continuous supplement is completed to supplement the sub-reservoir 200 with the washer fluid.

Through the control as described above, it is possible to prevent over-supplement of the sub-reservoir 200 with the washer fluid, thereby securing a hysteresis section for the input time of the level sensor.

The foregoing detailed description is illustrative of the present disclosure. In addition, the above description shows and describes preferred embodiments of the present disclosure, and the present disclosure may be used in various other combinations, modifications, and environments. That is, changes or modifications may be made within the scope of the concept of the invention disclosed in the present disclosure, the scope equivalent to the disclosed content, and/or the skill or knowledge in the art. The described embodiment illustrates the best mode for implementing the technical idea of the present disclosure, and various changes required in the specific application fields and uses of the present disclosure are possible. Therefore, the detailed description of the present disclosure is not intended to limit the invention to the disclosed embodiment. In addition, the appended claims should be construed as including other embodiments.

What is claimed is:

1. A washer system comprising:
   a plurality of measurement units configured to receive data for vehicle driving;
   a nozzle configured to provide a washer fluid to the measurement units;
   a main reservoir configured to store the washer fluid;
   a sub-reservoir coupled to at least one of the measurement units and configured to be supplemented with the washer fluid from the main reservoir;
   a controller configured to:
      determine a priority of the measurement units; and supply, in response to the priority of the measurement units, the washer fluid from the main reservoir to the sub-reservoir based on the measurement unit having a higher priority;

a first level sensor disposed in the main reservoir;

a second level sensor disposed below the first level sensor in the main reservoir; and a sub-level sensor disposed in the sub-reservoir and configured to determine a level of the washer fluid in the sub-reservoir, wherein the controller is configured to request supplementing the main reservoir with the washer fluid based on determining that a washer fluid level is below the second level sensor.

2. The washer system according to claim 1, further comprising:

a main washer pump disposed in the main reservoir configured to discharge a pressurized washer fluid; and a sub-washer pump disposed in the sub-reservoir configured to spray the pressurized washer fluid to the measuring units.

3. The washer system according to claim 1, wherein the controller is configured to:

supply an amount of the washer fluid to the sub-reservoir; and supply the washer fluid from the main reservoir to the sub-reservoir in pulse form up to a maximum amount.

4. The washer system according to claim 1, wherein the controller is configured to:

determine whether a daily usage capacity of the washer fluid is supplied through the first level sensor; and determine a vehicle drive-returnable capacity of the washer fluid through the second level sensor.

5. The washer system according to claim 1, wherein the controller is configured to supplement the sub-reservoir with the washer fluid in a capacity smaller than that used by the nozzle based on a determination that a washer fluid capacity of the main reservoir is less than or equal to the second level sensor.

6. The washer system according to claim 1, wherein the controller is configured to:

determine, via the first level sensor, whether a daily usage capacity of the washer fluid is suppliable, and determine, via the second level sensor, whether a vehicle needs to be returned to a destination.

7. The washer system according to claim 1, wherein the controller is configured to:

supply the washer fluid to the sub-reservoir when the washer fluid is measured by the second level sensor in a state in which the washer fluid is supplied from an outside of a vehicle; and completely supplement the main reservoir with the washer fluid when the washer fluid is measured by the sub-level sensor disposed in the sub-reservoir.

8. The washer system according to claim 1, wherein the controller is configured to supply the washer fluid to the sub-reservoir after spraying the washer fluid through the nozzle corresponding to a measuring unit when a request for cleaning the measuring unit coupled to the sub-reservoir is received while the washer fluid is supplied from the main reservoir to the sub-reservoir.

9. The washer system according to claim 1, wherein the controller is configured to calculate a remaining amount of washer fluid in the sub-reservoir by storing a number of operations of the nozzle coupled to the measurement units.

10. The washer system according to claim 9, wherein the controller is configured to supplement the washer fluid to the sub-reservoir connected to the nozzle when the number of operations of the nozzle is equal to or greater than a preset number of times.

11. The washer system according to claim 1, wherein the controller is configured to:

determine the priority of the measurement units when receiving requests for cleaning at least two or more measurement units, and supply the washer fluid from the main reservoir to the sub-reservoir having the higher priority.

12. The washer system according to claim 1, further comprising a distributor disposed between the main reservoir and the sub-reservoir or between the sub-reservoir and a measuring unit.

13. The washer system according to claim 12, wherein the distributor is coupled to the sub-reservoir, and wherein the plurality of measurement units are coupled to a discharge end of the distributor.

14. The washer system according to claim 12, wherein the distributor comprises a plurality of distributors, wherein the sub-reservoir comprises a plurality of sub-reservoirs, wherein the nozzle comprises a plurality of nozzles, and wherein each distributor is coupled to a respective sub-reservoir and a respective nozzle and the respective nozzle is connected to a respective measurement unit.

15. The washer system according to claim 1, wherein the controller is configured to supplement the sub-reservoir prior to the main reservoir with the washer fluid when the washer fluid is supplied from an outside of a vehicle.

16. The washer system according to claim 1, wherein the controller is configured to:

control a distributor to introduce the washer fluid into each sub-reservoir of a plurality of sub-reservoirs when the washer fluid reaches a position measured by the second level sensor of the main reservoir and when the washer fluid is supplied from an outside of a vehicle; and completely supplement the main reservoir when the washer fluid reaches a position measured by the sub-level sensor located in each sub-reservoir.

17. A washer system comprising:

a plurality of measurement units configured to receive data for vehicle driving;

a plurality of nozzles configured to provide a washer fluid to the measurement units;

a main reservoir configured to store the washer fluid;

a plurality of sub-reservoirs, each sub-reservoir of the plurality of sub-reservoirs coupled to a nozzle for a respective measurement unit and configured to provide the washer fluid to the respective measurement unit; and a controller configured to:

determine a priority of the measurement units; and supply the washer fluid from the main reservoir to the sub-reservoir based on the priority of the measurement units;

a first level sensor disposed in the main reservoir; and a second level sensor disposed below the first level sensor in the main reservoir, wherein the controller is configured to request supplementing the main reservoir with the washer fluid based on determining that a washer fluid level is below the second level sensor.

18. The washer system according to claim 17, each sub-reservoir comprises a sub-level sensor configured to determine a level of the washer fluid in the respective sub-reservoir.

19. The washer system according to claim 18, wherein the controller is configured to:

supply an amount of the washer fluid to the respective sub-reservoir based on a determination that the washer fluid is below a predetermined level in the respective sub-reservoir; and supply the washer fluid from the main reservoir to the sub-reservoir in pulse form up to a maximum amount.

20. The washer system according to claim 18, wherein the sub-reservoirs are located spaced apart from the main reservoir, and wherein each sub-reservoir is located to a respective nozzle.

\* \* \* \* \*